United States Patent Office 3,256,350
Patented June 14, 1966

3,256,350
PREPARATION OF HALOGENATED AROMATIC COMPOUNDS
Ernest Bryson McCall, Llangollen, and William Cummings, Marford, Wales, assignors to Monsanto Chemicals Limited, London, England, a British company
No Drawing. Filed Aug. 27, 1962, Ser. No. 219,756
Claims priority, application Great Britain, Sept. 4, 1961, 31,709/61
12 Claims. (Cl. 260—650)

This invention relates to a new process by which a halogen atom can be introduced into an organic compound.

The introduction of a halogen atom, such as a chlorine atom, into an aromatic nucleus does, in principle, constitute an important reaction, and halogeno-substituted aromatic compounds have a wide variety of uses.

The halogenation reaction that has now been discovered provides a valuable new route to many halogenated aromatic compounds that are otherwise rather inaccessible. These are obtained in a high state of purity and in the absence of undesirable dark-colored by-products.

The process of the invention is one for the production of a halogeno-substituted aromatic compound, in which an aromatic sulfonyl halide is subjected to thermal decomposition in the presence of a solvent that is substantially inert to free aryl radicals under the reaction conditions. Thus, by this reaction, sulfur dioxide is evolved from a sulfonyl halide group, and the halogen atom appears as a substituent in the aromatic nucleus.

For instance, by the process of the invention, m-dichlorobenzene can be obtained in good yield from the readily obtainable benzene-m-disulfonyl chloride.

In general, the sulfonyl halide that is employed as starting material is a sulfonyl halide of an aromatic compound; that is, a compound that possesses a cyclic system that is stabilized by the presence of non-localized π-electrons, for instance, benzene, diphenyl, naphthalene, benzofuran, thiophene or pyridine.

Similarly, the aryl radicals to which the solvent employed in the process is substantially inert are radicals possessing such a cyclic system, for instance, phenyl or naphthyl radicals.

The solvent itself is preferably an aromatic compound in which most or all of the nuclear positions are occupied by groups or atoms other than hydrogen.

By using the appropriate sulfonyl halide, a chosen halogen atom can be introduced; for instance, a sulfonyl chloride leads to the introduction of a chlorine atom; a sulfonyl bromide to a bromine atom; a sulfonyl iodide to an iodine atom; and a sulfonyl fluoride to a fluorine atom. Because of the generally greater stabilities of the aromatic sulfonyl fluorides, and the ease with which the aromatic sulfonyl iodides split out iodine, the process tends to be somewhat less effective for the production of an aromatic fluorine- or iodine-substituted compound than for the production of an aromatic chlorine- or bromine-substituted compound.

A mono-, di-, tri- or other halogeno-substituted aromatic compound can be obtained by use of a mono-, di-, tri- or other appropriate sulfonyl halide. The process is useful in the production of di-halogeno compounds from di-sulfonyl halides, and is particularly valuable in the production of m-di-halogeno compounds.

The process is normally carried out at an elevated temperature, for example a temperature higher than 125° C., and preferably above 150° C. Good results are obtained using a reaction temperature in the range of 200° C. to 300° C., for instance, between 240° C. and 275° C.

It is usual to operate the process at atmospheric pressure, so that the solvent employed is normally one having a boiling point, at this pressure, which is at least as high as the temperature at which the process is carried out. The process can, however, be operated under an elevated pressure where a suitable reaction temperature cannot be achieved at atmospheric pressure, for example, where the sulfonyl halide is too volatile.

The process proceeds smoothly at the appropriate elevated temperature, and the presence of a catalyst is not essential. Catalysts have been found, however, that in many instances will improve the efficiency of the process. These catalysts are, in general, certain metals and metal compounds.

By the process of the invention, there can be produced halogeno-derivatives of carbocyclic compounds such as benzene and condensed benzenoid systems such as naphthalene, and aromatic compounds having a heterocyclic ring such as furan, thiophene and pyridine. More than one ring or type of ring can be present. For example, the compound can be diphenyl, diphenyl ether or dibenzothiophene, and where, for instance, a compound contains two rings, the halogen atom can be introduced in either or both of them. In general, the aromatic compound can contain an existing substituent, for example an aliphatic group, for instance an alkyl or cycloalkyl group, such as methyl, octyl or cyclohexyl group; a halogen atom, for example chlorine or bromine; a nitro group; a carboxylic ester group; or an alkoxy group, for instance a methoxy, ethoxy, butoxy or hexyloxy group. Specific examples of aromatic compounds in which halogeno groups can be introduced are benzene, toluene, the xylenes, ethylbenzene, dodecylbenzene, diphenyl, o-, m- and p-terphenyl, quaterphenyl, 2-methyldiphenyl, 4-isopropyldiphenyl, 4,4'-diisopropyl-diphenyl, 1-methylnaphthalene, 1,6-dimethylnaphthalene, indene, anthracene, 3-ethylanthracene, chlorobenzene, fluorobenzene, nitrobenzene, o-nitrotoluene, anisole, diphenyl ether, 2-ethylthiophene, 2-phenylthiophene, thiophene-2-carboxylic ethyl ester, benzofuran, 4-methylbenzofuran, 4-phenylbenzofuran, dibenzofuran, 1-cyclohexyldibenzofuran, 1-phenyldibenzofuran, 1-cyclohexyldibenzothiophene, 2-phenyldibenzothiophene, and quinoline.

Specific halogeno compounds that can be produced by the process of the invention, starting, as has been described, from an appropriate sulfonyl halide are chlorobenzene, bromobenzene, fluorobenzene, o-dichlorobenzene, o-dibromobenzene, o-di-iodobenzene, m-dichlorobenzene, m-dibromobenzene, m-chlorobromobenzene, m-difluorobenzene, p-dichlorobenzene, p-dibromobenzene, p-difluorobenzene, p-chlorofluorobenzene, o-bromotoluene, m-chlorotoluene, p-chlorotoluene, m-iodoethylbenzene, p-chlorodiphenyl, m-bromodiphenyl, 2-bromonaphthalene, 2-chlorothiophene, 5-bromobenzofuran, 4-bromodibenzothiophene, 1,5-dichloronaphthalene, and 2,7-dibromonaphthalene.

Solvents that can be used in the process of the invention are preferably high-boiling ones; they include, for example, aromatic hydrocarbons, ethers, nitriles and carboalkoxy compounds in which, in all instances, at least about half of the hydrogen atoms of the parent substance have been replaced by halogen atoms; also included are perhalogenated saturated aliphatic hydrocarbons.

Halogenated aromatic hydrocarbons, such as the halogenated benzenes, naphthalenes, diphenyls and terphenyls, are generally preferred, especially such compounds where the halogen is fluorine, chlorine or bromine; examples of these compounds are the tetrachlorobenzenes, the pentachlorobenzenes, the pentabromobenzenes, hexachlorobenzene, hexabromobenzene, decafluorodiphenyl, and the chlorinated diphenyls and chlorinated terphenyls which contain a relatively high percentage of chlorine.

Examples of other compounds that can be used as solvents in the process are pentachlorophenyl trichloro-"

ethyl ether, the tetrachlorobenzonitriles, the dimethyltetrachlorophthalates, octachloropropane, and the hexachlorooctafluorohexanes.

It is often preferable that the halogen of a halogenated solvent should be the same as the halogen that is introduced into the aromatic nucleus in the process of the invention.

Where a catalyst is employed in the process of the invention, the metals, copper and palladium, and their respective compounds, are generally very effective. Catalytic activity is also shown by metals such as platinum, silver, cobalt and manganese, and by compounds containing these metals.

A metal can be employed as such or as an alloy with another metal. A compound can be, for instance, an oxide or hydroxide, a salt with an inorganic acid, such as a halide, sulfate, carbonate or nitrate, or a salt with an organic acid, for instance, an acetate or benzoate.

The halide salts, for example cuprous chloride, cuprous bromide, cuprous iodide, palladous chloride and palladous bromide, are particularly effective. In other instances, the compound can be one where the metal is present in an anion, for example, a chloropalladite, or one where the metal forms a "complex," for example with a nitrogen-containing compound, as, for instance, in a cuprammonium salt.

The catalyst will normally be present in the reaction mixture in a finely-divided form. It can be used as such, or it can, for example, be absorbed on the surface of a finely-divided inert support, such as, for example, powdered charcoal or kieselguhr.

Palladium on charcoal catalysts, containing, for instance, 5% or 10% by weight of palladium, have very high activities. Where such a catalyst is used, a very wide range of solvents for the process can be employed, because under these reaction conditions they are substantially inert to free aryl radicals even though this may not be completely so with respect to some of them in the absence of the catalyst. Diphenyl is, for instance, a useful solvent where the catalyst is palladium on charcoal.

Where a catalyst is used in the process, the quantity thereof can vary over a wide range. There can be employed, for instance, as much as 0.5 gram mol (or gram atom) of catalyst per gram mol of sulfonyl halide. Generally, much smaller quantities than this are satisfactory, and in certain instances as little as 0.0001 gram mol (or gram atom) of catalyst per gram mol of sulfonyl halide can be effective. The preferred number of gram mols (or gram atoms) of catalyst per gram mol of sulfonyl halide is generally within a range of about 0.001 to about 0.1, for instance, 0.005, 0.01 or 0.05. Excellent results are obtained using 0.01 gram mol (or gram atom) of catalyst per gram mol of sulfonyl halide.

The required halogen derivative can be isolated from the final reaction mixture in one of the conventional ways, but preferably, as the reaction proceeds, the product is removed by distillation. This can be arranged by employing a solvent having a higher boiling point than the product, in conjunction with a suitable condensing system at an appropriate temperature such that the vapors of the starting material and solvent are condensed and returned to the reaction vessel while the vapor of the product distills off and is condensed and collected in a separate receiver.

The reaction time will depend on the reaction temperature and other factors. A time of between two hours and 12 hours is generally satisfactory, for instance, a reaction time of about three to seven hours.

The process of the invention is illustrated by the following examples:

*Example 1*

This example describes the production of chlorobenzene from benzenesulfonyl chloride.

A solution of 137.8 grams (0.78 mol) of benzene sulfonyl chloride in 500 grams of hexachlorobenzene was heated at 250–260° C. for seven hours in the presence of 0.8 gram (0.008 mol) of cuprous chloride. Sulfur dioxide and a small amount of hydrogen chloride were evolved, and chlorobenzene was produced. The chlorobenzene was distilled from the reaction mixture as it was formed by using, in the apparatus employed for the reaction, a reflux condenser maintained at a temperature (130° C.) close to the boiling point of the chlorobenzene. When the reaction was complete, residual chlorobenzene was removed from the reaction mixture by bubbling a stream of nitrogen therethrough.

The initial crude distillate was redistilled, giving pure chlorobenzene having a boiling point of 130–132° C. in a yield of 63.2 grams (72% based on benzenesulfonyl chloride).

*Example 2*

This example describes the production of m-dichlorobenzene from benzene-m-disulfonyl chloride.

A solution of 62.8 grams (0.23 mol) of benzene-m-disulfonyl chloride in 218 grams of hexachlorobenzene was heated at 250–260° C. for five hours in the presence of 0.25 gram (0.0025 mol) of cuprous chloride. Sulfur dioxide and a small amount of hydrogen chloride were evolved, and m-dichlorobenzene was produced.

The evolved gases were absorbed in sodium hydroxide solution, and their amounts determined. The quantity of sulfur dioxide was equivalent to 90% of the benzene-m-disulfonyl chloride, and the quantity of hydrogen chloride to 6.4% of the benzene-m-disulfonyl chloride.

The m-dichlorobenzene was distilled from the reaction mixture as it was formed by using a reflux condenser maintained at a temperature (170° C.) close to its boiling point. The crude product thus obtained was redistilled, giving pure m-dichlorobenzene having a boiling point of 168–173° C. in a yield of 21.4 grams (63.6% based on benzene-m-disulfonyl chloride). The product was further characterized by conversion to its dinitro derivative, 1,3-dichloro-4,6-dinitrobenzene, a solid having a melting point of 102–103° C.

*Example 3*

This example describes the production of bromobenzene from benzenesulfonyl bromide.

A mixture of 85 grams of hexachlorobenzene and 0.1 gram (0.001 mol) of cuprous chloride was heated to 260° C., and 22.1 grams (0.1 mol) of benzenesulfonyl bromide were added over a period of five minutes. The reaction mixture was then heated at 250–260° C. for a further three hours. Sulfur dioxide, hydrogen bromide, and a small amount of bromine were evolved, and bromobenzene was produced.

The evolved gases were absorbed in sodium hydroxide solution, and their amounts determined. The quantity of sulfur dioxide was equivalent to 77% of the benzenesulfonyl bromide, and the quantity of hydrogen bromide to 17.4% of the benzenesulfonyl bromide.

The bromobenzene was distilled from the reaction mixture as it was formed by using a reflux condenser maintained at a temperature (160° C.) close to the boiling point of bromobenzene. The product thus obtained was shaken with sodium hydroxide solution to remove bromine, washed with water, and dried over magnesium sulfate. Redistillation gave pure bromobenzene having a boiling point of 148–155° C. in a yield of 10 grams (64% based on the benzenesulfonyl bromide).

*Example 4*

This example describes the production of 1,5-dichloronaphthalene from naphthalene-1,5-disulfonyl chloride, using as solvent a material obtained by chlorinating a mixture of diphenyl and terphenyls and containing 65% by weight of chlorine.

A mixture of 64.3 grams (0.2 mol) of naphthalene-1,5-disulfonyl chloride, 250 grams of the solvent, and 0.18 gram (0.001 mol) of palladium chloride was heated under reflux at 250–255° C. for four hours, during which time 96% of the theoretical quantity of sulfur dioxide was evolved.

The reaction mixture was distilled under reduced pressure to give crude 1,5-dichloronaphthalene which, after redistillation, was obtained as a colorless solid having a melting point of 102–107° C. The yield was 23.5 grams (60% of the theoretical).

*Example 5*

This example describes the production of 2,7-dichloronaphthalene from naphthalene-2,7-disulfonyl chloride.

A mixture of 64 grams (0.2 mol) of naphthalene-2,7-disulfonyl chloride, 250 grams of the solvent of Example 4, and 0.18 gram (0.001 mol) of palladium chloride was heated under reflux for four hours at 250–260° C. and for a further five hours at 286–292° C. During this time 85% of the theoretical amount of sulfur dioxide was evolved.

The product, 2,7-dichloronaphthalene, was isolated in 60% of the theoretical yield by essentially the same procedure as that described for the isomer of Example 4.

*Example 6*

This example describes the production of m-dichlorobenzene from benzene m-disulfonyl chloride in the presence of a palladium on charcoal catalyst using diphenyl as the solvent.

A mixture of 27.5 grams (0.1 mol) of benzene-m-disulfonyl chloride, 231 grams (1.5 mol) of diphenyl, and 2.2 grams of palladium on charcoal containing 5% by weight of palladium was heated under reflux. Evolution of sulfur dioxide commenced at about 210° C.; 12 minutes later the mixture was boiling (at 253° C.) and was maintained thus for a further 48 minutes. At the end of this time, 95% of the theoretical amount of sulfur dioxide had been evolved, and the reaction mixture was cooled; hydrogen chloride equivalent to 25% of the benzene-m-disulfonyl chloride had also been evolved. Analysis of the product by vapor phase chromatography showed that m-dichlorobenzene equivalent to at least 55% of the benzene-m-disulfonyl chloride had been formed.

It will be recognized that the specific embodiments set forth above are presented for the purpose of illustration only. Variations and modifications may be made by those skilled in the art without departure from the spirit and scope of this invention as defined in the appended claims.

What is claimed is:

1. A process consisting essentially of heating, in a liquid phase, at a temperature of at least about 125° C. and in the presence of a substantially inert solvent selected from the group consisting of halogenated aromatic hydrocarbons having at least half of the nuclear hydrogen atoms replaced by halogen atoms and perhalogenated saturated aliphatic hydrocarbons, an aromatic sulfonyl halide of the formula:

$$R(SO_2X)_n$$

wherein:
  $n$ is an integer from one to three;
  X is selected from the group consisting of chlorine and bromine;
  R is selected from the group consisting of phenyl, naphthyl, biphenylyl, terphenylyl, quaterphenylyl, phenoxyphenyl and the substituted derivatives thereof wherein the substituents are selected from the group consisting of alkyl of one to twelve carbon atoms, alkoxy of one to six carbon atoms, nitro and halogen; and
  each ($SO_2X$) group is attached to a nuclear carbon atom of R.

2. A process as defined in claim 1 wherein the boiling point of the solvent is at least as high as the temperature to which the aromatic sulfonyl halide is heated.

3. A process as defined in claim 1 wherein the aromatic sulfonyl halide is heated at a temperature of from about 200° C. to 300° C.

4. A process consisting essentially of heating, in a liquid phase at a temperature of at least about 125° C., in the presence of a substantially inert organic solvent, and in the presence of a catalyst selected from the group consisting of copper, platinum, palladium and the halides thereof, an aromatic sulfonyl halide of the formula:

$$R(SO_2X)_n$$

wherein:
  $n$ is an integer from one to three;
  X is selected from the group consisting of chlorine and bromine;
  R is selected from the group consisting of phenyl, naphthyl, biphenylyl, terphenylyl, quaterphenylyl, phenoxyphenyl and the substituted derivatives thereof wherein the substituents are selected from the group consisting of alkyl of one to twelve carbon atoms, alkoxy of one to six carbon atoms, nitro and halogen; and
  each ($SO_2X$) group is attached to a nuclear carbon atom of R.

5. A process as defined in claim 4 wherein the catalyst is a palladium catalyst, and the solvent is selected from the group consisting of diphenyl and terphenyl.

6. A process as defined in claim 4 wherein the molar ratio of catalyst to aromatic sulfonyl halide is at least 0.0001:1.

7. A process as defined in claim 6 wherein said molar ratio is from about 0.001:1 to 0.1:1.

8. A process consisting essentially of heating, in a liquid phase, benzenesulfonyl chloride at a temperature of from about 200° C. to 300° C. in the presence of a substantially inert solvent selected from the group consisting of halogenated aromatic hydrocarbons having at least half of the nuclear hydrogen atoms replaced by halogen atoms and perhalogenated saturated hydrocarbons, the boiling point of said solvent being at least about 200° C.

9. A process consisting essentially of heating, in a liquid phase, benzenedisulfonyl chloride at a temperature of from about 200° C. to 300° C. in the presence of a substantially inert solvent selected from the group consisting of halogenated aromatic hydrocarbons having at least half of the nuclear hydrogen atoms replaced by halogen atoms and perhalogenated saturated hydrocarbons, the boiling point of said solvent being at least about 200° C.

10. A process as defined in claim 9 wherein the chloride is benzene-m-disulfonyl chloride.

11. A process as defined in claim 10 wherein the solvent is hexachlorobenzene.

12. A process consisting essentially of heating, in a liquid phase, a benzenedisulfonyl chloride at a temperature of from about 200° C. to 300° C. in the presence of diphenyl and a palladium catalyst.

References Cited by the Examiner

UNITED STATES PATENTS 2,900,297  8/1959  Wygant _____ 260—650 X

FOREIGN PATENTS 98,433  12/1896  Germany.
740,677  11/1943  Germany.

OTHER REFERENCES

Gilman, "Organic Chemistry," Vol. I, page 900 (1953).

LEON ZITVER, *Primary Examiner.*

HAROLD G. MOORE, *Examiner.*

K. H. JOHNSON, K. V. ROCKEY, *Assistant Examiners.*